United States Patent [19]

Baumgart et al.

[11] 4,244,482
[45] Jan. 13, 1981

[54] MULTI-LAYER CONTAINER

[75] Inventors: Frank Baumgart, Ratingen; Joachim Jorde, Essen; Karl Opitz, Essen; Heinrich Rywalski, Essen, all of Fed. Rep. of Germany

[73] Assignee: Fried, Krupp Gesellschaft mit beschränkter Haftung, Essen, Fed. Rep. of Germany

[21] Appl. No.: 906,991

[22] Filed: May 17, 1978

Related U.S. Application Data

[63] Continuation of Ser. No. 782,406, Mar. 29, 1977, abandoned.

[30] Foreign Application Priority Data

Mar. 30, 1976 [DE] Fed. Rep. of Germany ....... 2613441

[51] Int. Cl.³ .................. B65D 90/04; F16L 9/02; F16L 9/14
[52] U.S. Cl. ......................................... 220/3; 138/142; 138/143; 138/147; 138/151; 220/468; 228/184
[58] Field of Search ................ 220/75, 76, 3, 80, 414, 220/468; 138/147, 151, 170, 171, 167, 140, 141, 142, 143; 228/184

[56] References Cited

U.S. PATENT DOCUMENTS

| | | | |
|---|---|---|---|
| 1,240,098 | 9/1917 | Sweeney | 220/76 X |
| 1,863,873 | 6/1932 | Quarnstrom | 138/171 X |
| 2,072,273 | 3/1937 | Obert | 138/151 |
| 2,124,004 | 7/1938 | O'Neil | 220/75 |
| 2,160,009 | 5/1939 | Walker | 138/151 X |
| 2,209,402 | 7/1940 | Kepler | 228/184 X |
| 2,365,697 | 12/1944 | Grubb | 220/3 |
| 2,376,351 | 5/1945 | Gay | 220/3 |
| 2,480,369 | 8/1949 | Jasper | 220/3 X |
| 3,062,507 | 11/1962 | Andrns | 220/3 X |
| 3,070,274 | 12/1962 | Elam | 138/167 |
| 3,225,952 | 12/1965 | Stiles | 220/80 X |
| 3,390,563 | 7/1968 | Fuchs, Jr. | 220/3 X |
| 3,425,380 | 2/1969 | Krainer et al. | 220/3 X |
| 3,434,503 | 3/1969 | Knox | 220/75 X |
| 3,439,586 | 4/1969 | Holtan et al. | 138/143 X |
| 3,461,917 | 8/1969 | Uto et al. | 220/3 X |
| 3,478,784 | 11/1969 | Woelfer et al. | 220/3 X |
| 3,504,710 | 4/1970 | Pancoast | 220/76 X |
| 3,601,436 | 8/1971 | Jorgensen | 220/3 X |
| 3,664,379 | 5/1972 | McCabe | 220/3 X |
| 3,704,509 | 12/1972 | Yamanchi | 228/184 |
| 3,870,218 | 3/1975 | Ehle | 228/213 X |

FOREIGN PATENT DOCUMENTS

| | | | |
|---|---|---|---|
| 888771 | 2/1962 | United Kingdom | 220/3 |
| 1020023 | 2/1966 | United Kingdom | 220/3 |

OTHER PUBLICATIONS

Harvey, J. F. *Theory and Design of Pressure Vessels*, N.Y. Van Nostrand Reinhold Co., 1974, pp. 386–387.

*Primary Examiner*—Allan N. Shoap
*Attorney, Agent, or Firm*—Becker & Becker, Inc.

[57] ABSTRACT

A multi-layer container which includes a container forming a body of rotation in a tubular or at least partially spherical or conical shape, and having a plurality of layers of weldable sheet metal therewith. The first one of these layers is wrapped directly upon and around the container and the other layers are wrapped around the first layer and one upon the other. Each layer includes at least one joint extending in the longitudinal direction of the container; at least some are only partially filled with welded material.

3 Claims, 9 Drawing Figures

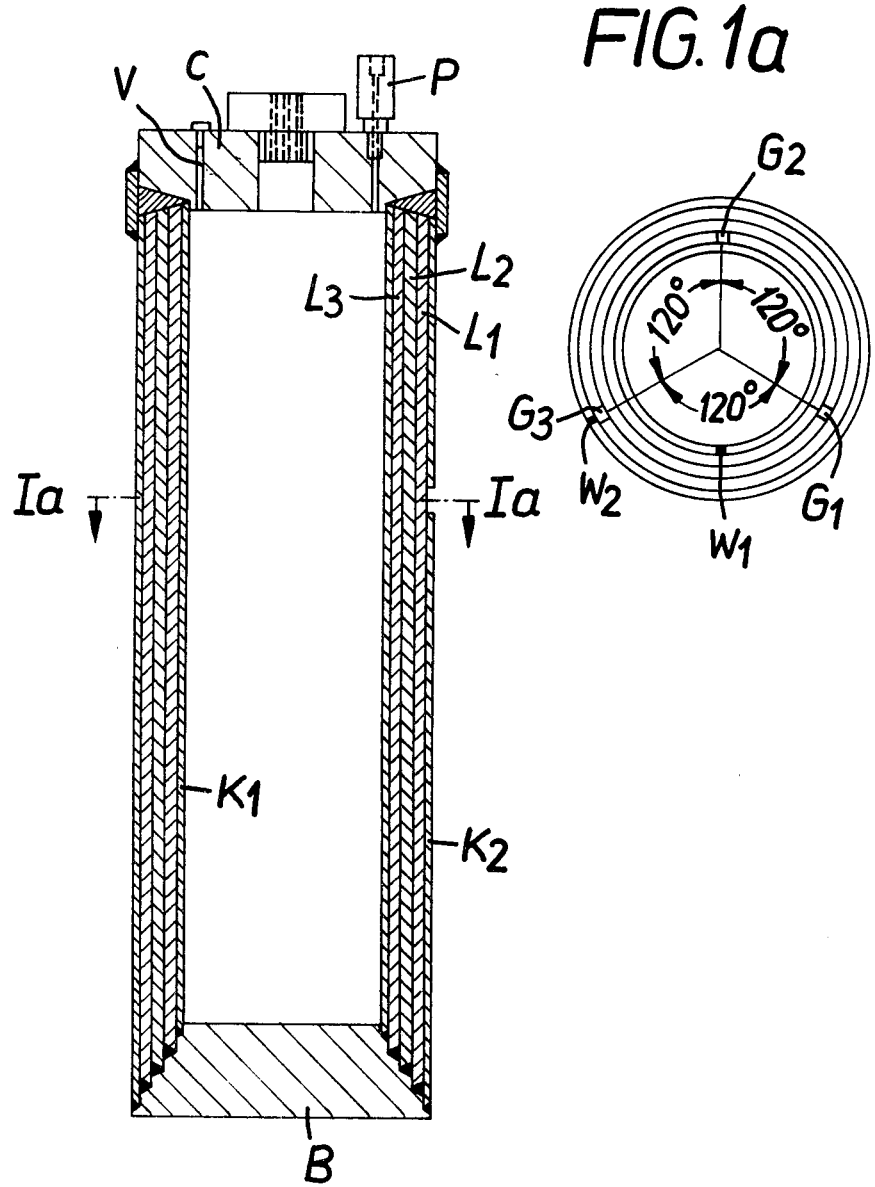

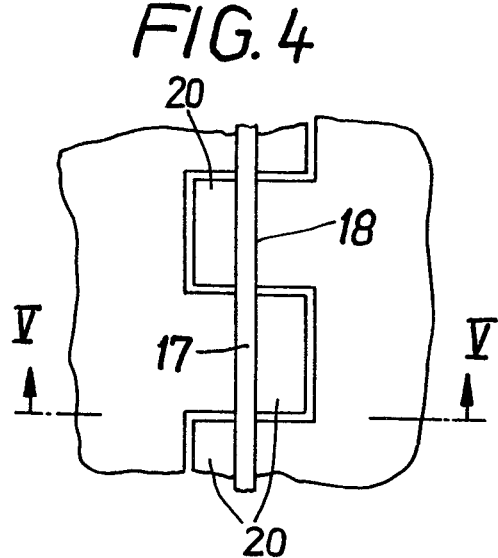
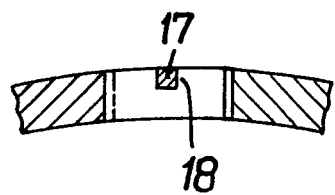
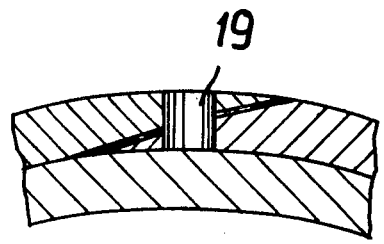

MULTI-LAYER CONTAINER

This is a continuation application of parent application Ser. No. 782,406 filed Mar. 29, 1977, now abandoned.

BACKGROUND OF THE INVENTION

The present invention relates to a multi-layer container in the form of a body of rotation having a plurality of layers wrapped upon each other. The container has at least one longitudinal seam per layer provided by adjacent longitudinal edges and comprises a core or core pipe as well as the plurality of layers wrapped therearound. Such containers are particularly useful as pressure containers or vessels for chemical and petroleum substances.

For purposes of making such a multi-layer container, first pre-formed sheet metal layers are tensioned around the core pipe. Subsequently the layers are tensioned around the respective preceding layer. The layers are pressed relative to each other so that an engagement as complete as possible will be realized. Only in this way, will there be assured the necessary uniform load distribution over all layers. During the tensioning of the layers, the layer ends or edges of seams are at some points only fastened by tack welding and subsequently are completely welded, as required.

It is an object of the present invention to provide a multi-layer container of the above mentioned general type which is considerably improved over previous container structures.

This object and other objects and advantages of the invention will appear more clearly from the following specification in connection with the accompanying drawings, in which:

FIG. 1 is a longitudinal section through a container according to the invention.

FIG. 1a represents a section taken along the line 1a—1a of FIG. 1.

Figure 2:
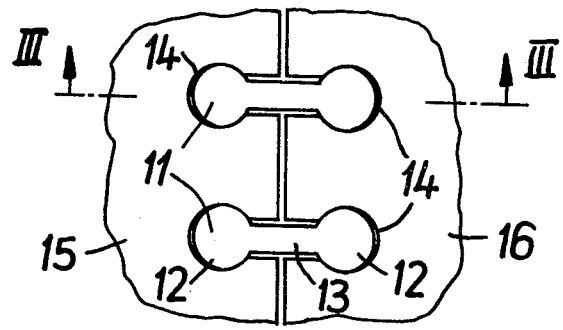
Figure 3:
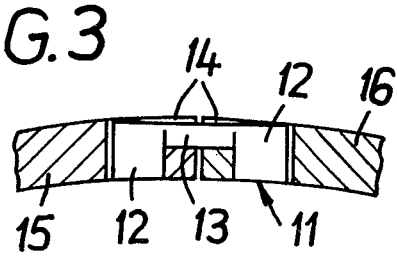
Figure 2A:
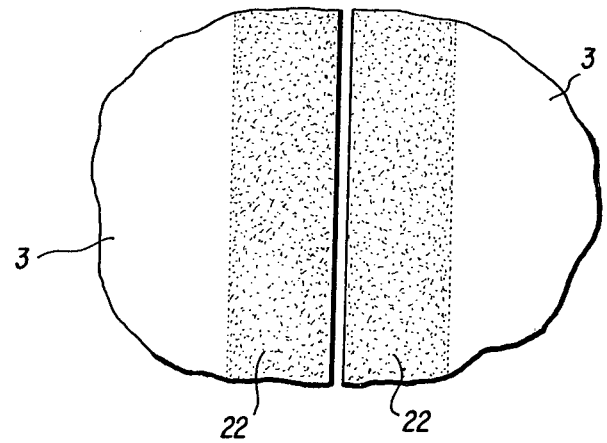

FIGS. 2 to 6 respectively illustrate three different embodiments of a positive connection of a longitudinal seam in a multi-layer container according to the invention. Of these Figures, FIG. 3 is a section taken along the line III—III of FIG. 2. FIG. 2a shows a roughened surface. FIG. 5 is a section taken along the line V—V of FIG. 4.

SUMMARY OF THE INVENTION

The multi-layer container according to the present invention is provided with at least one longitudinal gap in a seam per layer. Moreover the present invention is characterized primarily in that some of the layers but not all are at most welded only in part.

Surprisingly, it has been found that the present invention does not bring about a weakening of the multi-layer container. The required test of the strength in this connection can be made in an unequivocable manner by means of prevalent contact pressures between the supporting layers. Such pressures can be measured on the basis of the actually existing relationship or correlation pertaining for the looping friction.

Among advantages realized by the invention there may be included primarily the considerable saving of welding labor and/or savings in volume of material for joining the longitudinal adjacent ends of pertaining layers in a seam. This entails less application of welding heat and results in less distortion of the container. Since, however, with multi-layer containers each welding seam has to be checked completely, also the means and time for carrying out such checking will be reduced.

According to a further development of the invention, there are provided positive connections at least partially along the longitudinal seams. This feature represents an additional safety measure considered necessary and advantageous in many instances.

According to a further feature of the present invention, within the region of a non-interconnected longitudinal seam there is provided a zone or sector of at least 60°. More specifically at least 30° is provided on each side in the sector for the total of at least 60° of the seam; accordingly with all layers, an undistributed uniform tensioning condition is attained in an arrangement that causes such tensioning condition, for instance along a welded or nonwelded longitudinal seam. The magnitude or size of the sector preferably amounts to an angle within the range of from 30° to 40° on both sides of a pertaining gap. The last mentioned two features bring about that in the region of the frictional contact of a pertaining layer between two adjacent layers, the transfer of required frictional contact can be effected in a completely undisturbed and safe manner. The magnitude of the aforementioned safety sector to be selected depends primarily on the friction between the layers; as a safety factor as great as possible is to be achieved.

In this connection, it is pointed out that the transfer of the pulling force by the adjacent layer occurs wherever the pulling force is interrupted in a layer, for instance, by a longitudinal tear or by the longitudinal joint or gap according to the present invention. However, at both sides of the longitudinal joint there must be a sufficiently wide range in which this transfer of the pulling force can occur. Therefore, in this range in the adjacent layer there should not again exist any longitudinal joint.

Moreover, not only a longitudinal joint should be avoided at these areas, but everything should be avoided which may interfere with a uniform pull tension. This means that for instance the texture of the material must not be changed by heat influences as may be the case due to arranging a welding seam in the vicinity of the area where a transfer of the pull force is to be effected.

Preferably, the layer has a greater frictional coefficient than metal sheets generally. Thus, the surfaces of the layer with greater frictional coefficient may have a greater roughness. This roughness of surfaces may prevail only within the region of the pertaining longitudinal gap or seam.

These features bring about that a still further volume of seam weld material can be saved. The roughening of the surface may be effected by sand blasting whereby the surfaces are at the same time made more uniform. The greater frictional coefficient may also be obtained by a corresponding selection of the respective material.

According to still another feature of the invention, each longitudinal seam may have at least one interruption in the welding seam.

The invention is also applicable to containers of at least partially spherical or conical shape. For the sake of simplicity, the invention is merely described in connection with a container having a round or elliptical cross section.

DETAILED DESCRIPTION

Referring now to the drawings in detail, FIG. 1 shows the structure of a container according to the invention. The container includes three supporting layers L1, L2, L3 wrapped or tensioned around the core pipe K1. The layers L1, L2, L3 are covered on the outside by a layer K2. The layers L1, L2, L3 are not welded in the longitudinal direction as is indicated by the gaps G1, G2, G3 in FIG. 1a. The longitudinal ends of the inner and outer layers K1 and K2 are welded together as is indicated by the welds shown in FIG. 1a and designated with the letters W1 and W2. The container of FIG. 1 has a bottom B welded or sealingly connected in any convenient manner to the wall of the container. The wall includes the core pipe K1 and the layers L1, L2, L3 and K2. As a specific example for a container of the type of the present invention, the bottom B may be 155 mm. The thickness of the container wall comprising the core pipe K1 and the layers L1, L2, L3 and K2 may be 40 mm. Each of the layers L1, L2, L3 may be 10 mm. The thickness of the core pipe K1 and also the thickness of the outer layer K2 may each be 5 mm. The core pipe or inner layer K1 seals the container. The outer layer K2 is intended to prevent springing open of the lower supporting shell or layers. In order to limit the influence of the welding seams W1, W2 for total support purposes in an overall manner, the wall thickness of the core pipe including each of the layers K1 and K2 is accordingly only 5 mm. The cover B is stepped in a stair-like manner and when building up the container, the inner layer K1 is first applied to the uppermost step of the bottom B with regard to FIG. 1. Subsequently, there is effected the mounting of the other layers which are pre-rolled to true measurement. Each of these layers is tightened or tensioned in circumferential direction by tightening tools and brought into engagement with the next inner layer. The longitudinal gaps G1, G2 and G3 of the three layers L1, L2, L3 are offset with regard to each other according to FIG. 1a by 120°. The gaps G1, G2 and G3 are not filled with welding material. For mounting purposes, only four tacking areas are provided. In the specific example, the four tacking areas are only about 30 mm long. The welding seam W2 of the outer layer K2 is located above the gap G3 of the third supporting layer L3. The gap G3 is filled by a loosely inserted filler plate material.

The container also has a second bottom or cover C which is provided with openings for the pressure-tight passages for cables, for receiving pressure gauges and for permitting the supply of oil under pressure P in the container. The cover C is also provided with ventilating means V.

Figure 1B:
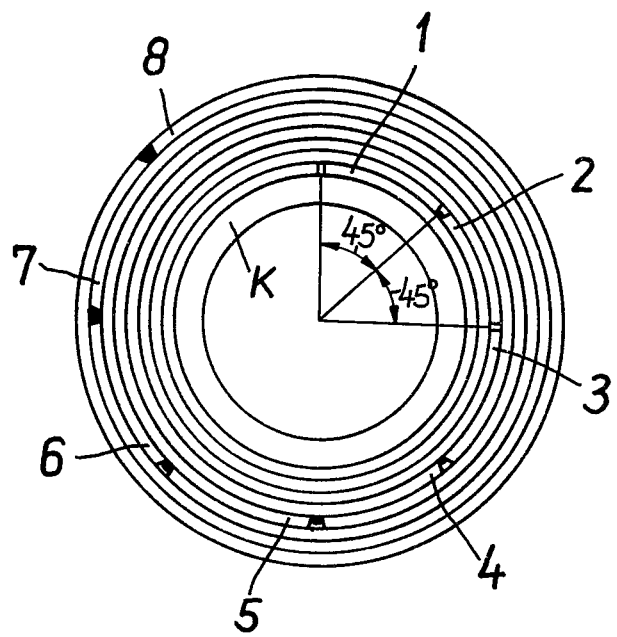
FIG. 1b is a section similar to that of FIG. 1a as taken through a modified container of the invention.

The diagrammatically illustrated container according to FIG. 1b comprises a core in the form of a body of rotation about a longitudinal axis in the form of a core pipe K and eight shut metal plates on layers 1-8 wrapped around said core pipe K. The layer 1 adjacent to the core pipe K comprises no connecting elements with the exception of some attaching areas for assembly purposes. In the next layer 2, the longitudinal seam formed by opposed edges of the plate is offset by 45° relative to the preceding longitudinal seam and has a low volume of welding material. This offset arrangement also applies to all successive layers. Any seam connection of the longitudinal seam of layer 3 corresponds to that of layer 1, and the longitudinal seam of layer 4 has a volume of welding material like that of layer 2. The seams of layers 5 and 6 have a greater volume of welding material. The seams of the layers 7 and 8 are filled continuously with welding material.

It may be mentioned that for a container with a relatively small diameter according to the present invention the outer layer can be in the form of a resilient clamp. Also, a plurality of such clamps may be utilized adjacent to each other as bandages.

FIG. 2 shows a cutout of a view of a layer according to which the positive mechanical connections are provided by mechanical connectors or fitting members 11 serving as a lock. FIG. 3 represents a section taken along the line III—III of FIG. 2. Each of the fitting members 11 has two cylindrical portions 12 and a connecting link 13. The members 11 are moved radially from the outside into correspondingly shaped recesses 14 of which ½ of each is arranged in those layer ends 15 and 16 which are located opposite to each other.

For pressing the layers into engagement relative to each other and the core pipe, one of the punches, arranged in pairs and located opposite to each other while forming a part of a tensioning device, may engage the cylindrical portion of each second recess. After tensioning to effect the operation for pressing the layers into engagement relative to each other and the core pipe, half of the number of the fitting members 11 are introduced. If expedient, after removal of the clamping devices, the other half of the number of fitting pieces are introduced into the recesses 14 utilized in the operation for pressing the layers into engagement relative to each other and the core pipe. In case the layers have not been made exact, the fitting pieces of different dimensions and/or lining members for lining purposes may be held in readiness. FIG. 4 shows the top or plan view of another embodiment of a positive connection. According to this embodiment, the longitudinal edges facing each other and pertaining to a layer are provided with teeth 17 meshing with each other. A rod or strip 19 is inserted in a longitudinal seam 18 extending transverse to the tooth flanks 20. The cross section of said strip 19 can best be seen from FIG. 5 which represents a section taken along the line V—V of FIG. 4.

The positive connections referred to above are intended primarily for positively connecting materials which are not weldable or which are weldable only with difficulties, if such materials have to be utilized or must be utilized.

According to the embodiment of FIG. 6 which shows a cutout of a cross section through two layers, the layer ends or edges facing each other are bevelled in such a way that they overlap. In about the central region of the overlap, a number of pins 19 is arranged in continuous bores.

As material for the layers of the multi-layer container, suitable weldable metals may be used, primarily structural steel (fine grain steel).

Thus, the invention is also applicable to spherically shaped containers. In such an instance by longitudinal seams are to be understood all seams which extend rectillinearly in side view. Generically a multi-layer container or core (k) in the form of a body of rotation is provided. The container includes a core and a plurality of layers (1-8) of weldable sheet metal, the first one (1) of these layers being wound directly upon and around the core (k), and the remaining layers (2-7) being wound one upon the other, each one of the layers defining at least one longitudinal groove extending in the longitudinal direction of said container, and at least some of the grooves being only partially filled with welded material.

FIG. 2a shows area 22 roughened by sand blasting. The area 22 is limited to portions of the plate 3 adjacent the seam and increases the coefficient of friction between plates.

It is, of course, to be understood that the present invention is in no way limited to the specific showing in the drawings, but also comprises any modifications within the scope of the appended claims.

What we claim is:

1. A multi-layer pressure container comprising in combination:

a core in the form of a body of rotation about a longitudinal axis;

a plurality of sheet metal plates having longitudinal edges, one of which plates is wrapped directly around the core with the edges of the plate in opposed relation to form a longitudinal seam, which seam is substantially opened by the lack of continuous welding material along the length of the longitudinal seam; the other plates being wrapped about the first plate in superimposed relation with respect to one another with each plate forming a seam between the opposed longitudinal edges thereof; the seams being displaced arcuately with respect to one another whereby the seams are not linearly aligned on the same radius and whereby there is a distribution of seams substantially throughout 360° of rotation; and welds distributed in the longitudinal seams of a plurality of the other plates with the volume of welded material from one plate of said plurality of said other plates to another plate of said plurality of said other plates increasing in the radially outward direction, with the seam of the outermost plate of said container being completely welded along the length thereof and being completely filled with welded material.

2. The pressure container of claim 1 comprising a seam secured together by mechanical connector means.

3. The pressure container of claim 1 comprising a plate with a surface having a higher coefficient of friction than an adjacent surface.

* * * * *